W. A. CAHILL.
CARBURETER.
APPLICATION FILED JULY 17, 1911.

1,084,693.

Patented Jan. 20, 1914.

2 SHEETS—SHEET 1.

WITNESSES:
F. E. Thomas
G. E. Mull

INVENTOR.
William A. Cahill
BY Harry De Wallace
ATTORNEY.

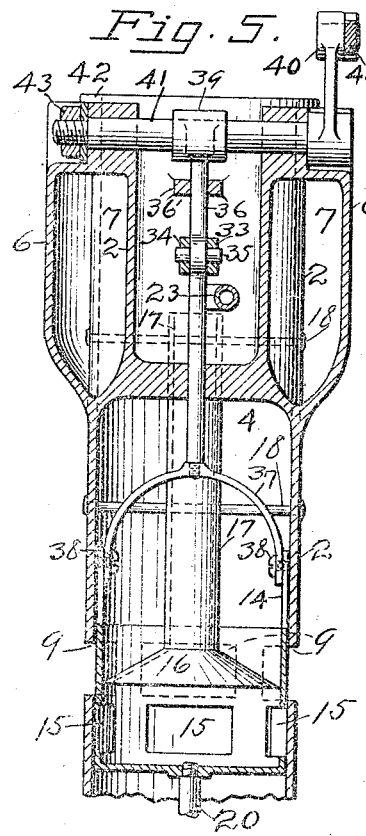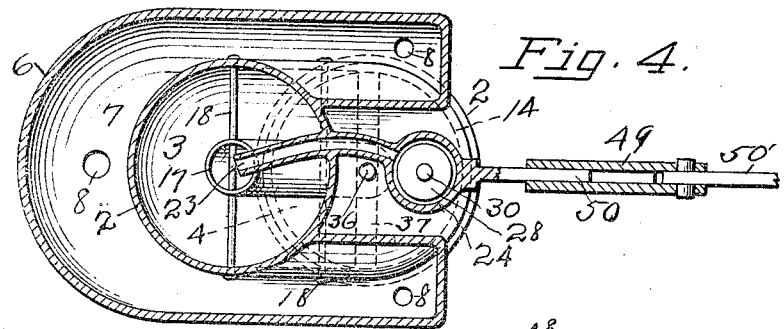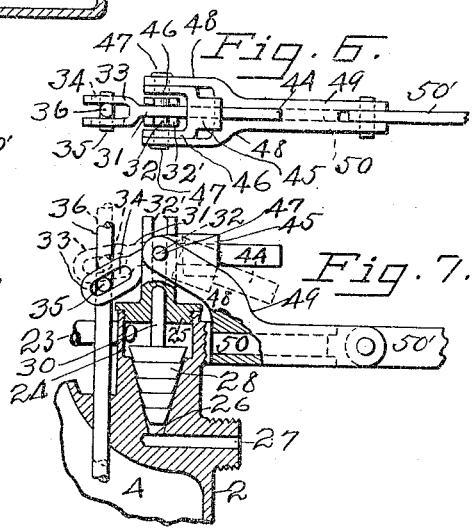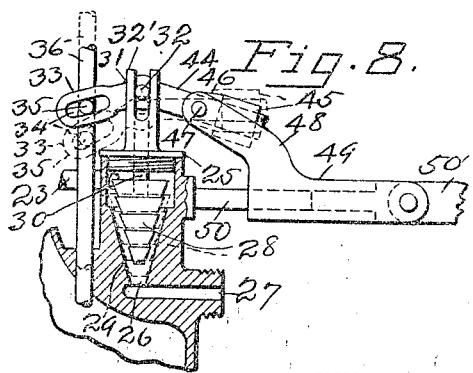

UNITED STATES PATENT OFFICE.

WILLIAM A. CAHILL, OF SYRACUSE, NEW YORK.

CARBURETER.

1,084,693.  Specification of Letters Patent.  Patented Jan. 20, 1914.

Application filed July 17, 1911. Serial No. 638,887.

*To all whom it may concern:*

Be it known that I, WILLIAM A. CAHILL, a citizen of the United States, residing at Syracuse, in the county of Onondaga and State of New York, have invented certain new and useful Improvements in Carbureters, of which the following is a specification.

This invention relates to improvements in carbureters, designed for use in connection with gas-engines, and the invention relates particularly to a self-controlled vaporizer for liquid hydro-carbon fuels employed for operating internal combustion engines.

The object of the invention is to provide a carbureter, whose action is entirely controlled by the suction of the engine-piston, whereby the proper proportion and regulation of the intake of air and liquid is obtained, and the combustible mixture is delivered to the engine in a thoroughly vaporized condition.

A further object is to provide means for positively and conveniently feeding the liquid to the carbureter, and also in means for adjusting the said parts while the engine is running at any speed, as well as, while the engine is standing still, for the purpose of increasing or decreasing the supply of liquid fuel.

A further object is to provide means for maintaining the relative proportions of air and liquid, so that the proper mixture will be supplied to the engine, regardless of the quantities of liquid drawn from the carbureter.

A further object is to provide novel and simple means for completely shutting off the supply of liquid while the engine is running, thereby allowing the piston to draw fresh air into the cylinders for the purpose of cooling the working parts of the engine, this latter feature being particularly employed while the vehicle is descending a grade, or traveling under momentum.

A further object is to dispense with the use of a float valve for controlling the feed or flow of the gasolene or other oil, thereby producing a construction which is more effective and reliable in its action.

Other features and parts of the invention will be understood from the detail description which follows, and by reference to the accompanying drawings, which form a part of this specification, and in which—

Figure 1:
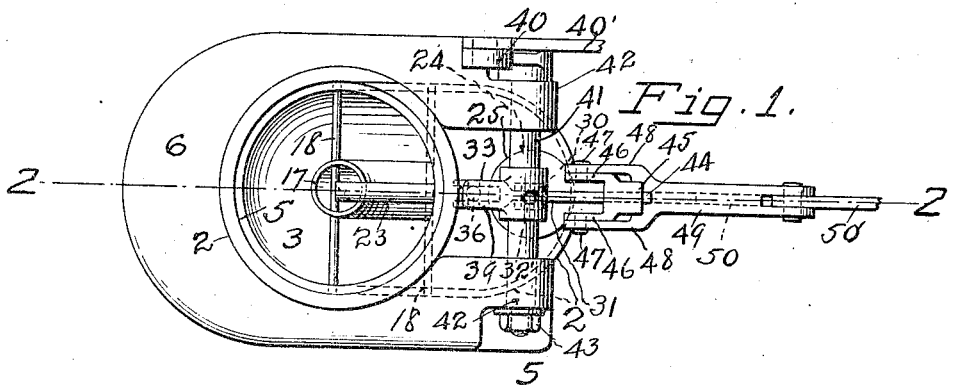
Figure 2:
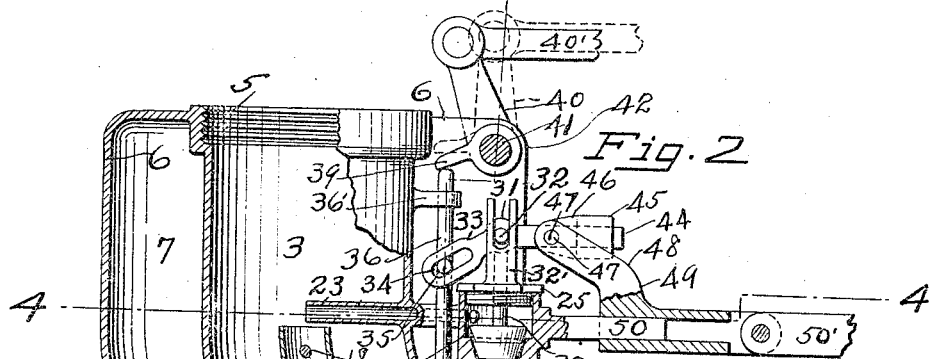
Figure 3:
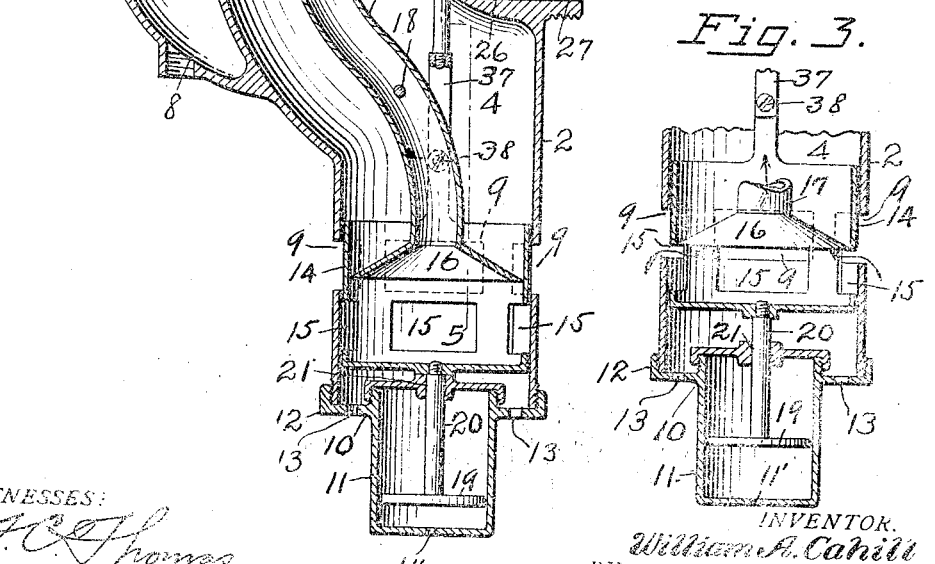

Figure 1 is a top plan view of the complete carbureter. Fig. 2 is a central vertical section, taken on line 2—2 of Fig. 1; showing the construction and arrangement of the working parts of the device. Fig. 3 is a partial section, taken on line 2—2 of Fig. 1; showing the tubular valve partially open for admitting air into the body. Fig. 4 is a transverse cross-section, taken on line 4—4 of Fig. 2. Fig. 5 is a transverse vertical sectional view taken on line 5—5 of Fig. 2. Fig. 6 is a plan view of the parts shown in Fig. 7. Fig. 7 is a side view and part section of the liquid valve and its controlling mechanism; showing the rocking lever operating on a dead-center. Fig. 8 is a similar view; showing the rocking lever operating on adjustable center.

In the drawings, 2 represents the main casing or body of the carbureter, which is hollow throughout, and the hollow interior comprises a carbureting chamber 3 and an air-inlet chamber 4. The upper end of the body 2 has a threaded opening 5 for attaching the device to an engine.

6 represents an integral jacket which partially encircles the body 2, and which coöperates with the upper portion of the body for forming a chamber 7, for receiving the exhaust from the engine for heating the carbureting chamber 3 during cold weather.

8 represents vents or ports for use in charging or draining the chamber 7.

The axis of the air-inlet chamber 4 is arranged eccentric or parallel to the axis of the carbureting chamber 3, and near its lower end the body is provided with a number of normally open air vents or windows 9, which are preferably spaced equidistantly around the body. The extreme lower end of the casing 2 is externally threaded, and is closed by a cap 10, which consists of a depending air-cylinder 11, having an annular flange 12, the upturned portion of which is threaded for engaging the body.

13 represents a number of ports or holes arranged in the flange 12 for admitting atmospheric pressure into the lower end of the body 2. The air inlet ports or windows 9 are opened and closed by the reciprocal movements of an air-inlet valve 14, which consists of a tube arranged to move telescopically within the casing 2. The tube 14 is closed at its bottom, and immediately above the bottom is provided a series of ports or windows 15, corresponding in number, size and spacing to the ports 9 in casing 2. When the valve 14 is in its lowermost position, shown in Figs. 2 and 5, as when the engine is at rest, the air-inlets 15 are positioned below the ports 9, which are then closed, during which time no air can enter the interior of the body 2. The valve 14 is arranged to move to the closed position by gravity, and this action is facilitated by the small ports 13 in the cap 10. The valve 14 is designed to be lifted only by the suction created by the engine-piston, for bringing the ports 15 into register with the ports 9, for admitting air into the chambers 3 and 4. The valve or tube 14 is rendered instantaneously sensitive to the suction of the piston by reason of the fact that the lower end of the tube is closed, and also by reason of the free admission of air through the ports 13 of the cap 10. As soon as the piston of the engine begins to move downwardly, the suction creates a vacuum in the chambers 3 and 4, which exerts an upward pull or lift upon the tube-valve 14, and the said valve immediately begins to lift, for bringing the ports 15 opposite the ports 9. At the first slight opening of the ports 9—15, atmospheric pressure enters the tube 14 and passes into the flared mouth 16 of a small tube 17, which extends upwardly from the inlet-ports 9 part way the length of the carbureting chamber 3. The carbureting-tube 17 is supported at intervals and is held concentrically in the casing, by means of transverse pins 18, as shown in Figs. 1, 2, 4 and 5. The tube 17 forms the main or direct passage for the air which is later mixed with the gasolene or other oil for forming the fuel-gas which operates the engine. The space within the casing 2 surrounding the tube 17 serves as an auxiliary air passage, which tends to regulate and equalize the suction, as well as, the mixing of the gas. The flaring mouth 16 of the tube 17 is preferably disposed a short distance above the lower edges of the intake-ports 9, and it is fitted to the interior of the valve 14 sufficiently tight to prevent air from passing between the said mouth and the tube 14 when the latter is lifted to a small degree. Beneath the tubular valve is disposed an air dash-pot, comprising the depending air chamber 11, of the cap 10, in which is disposed a piston 19, which is rigidly connected to the bottom of the valve 14 and is movable therewith by means of a rod 20. The rod 20 passes through and is guided by means of a perforation 21 arranged concentrically in the cap 10. The lower end of the air chamber 11 is closed except for a small pin hole or opening 11', which prevents the formation of a vacuum therein. The dash-pot is provided for steadying the valve 14, for preventing it from fluttering during the working of the engine incident to the increase or decrease of suction. By the employment of the dash-pot, it requires a slight pull by the suction of the piston of the engine to lift the valve 14, and when it is lifted to the proper height, owing to the speed of the engine, the piston draws air into the dash-pot through the port 11', which serves to hold the air-inlet valve 14 steadily in the desired position, and by this means, the dash-pot contributes to the proper mixing of the combustible vapor by which the engine is operated. Under the construction and operation of the parts thus far described, the lifting of the valve 14 is entirely effected and controlled by the suction of the engine-piston, and it will open to a greater or less extent owing to the increase or decrease in the speed of the engine, unless its movement is restricted by a throttling device which will later be described. The faster the engine turns, the more frequent the suction drafts and the greater volume of air is required, and to effect requisite supply of air, the valve 14 will be lifted higher, for opening the ports 9 and 15 wider, as the speed of the engine increases.

When the air-valve 14 is lifted, the piston 19 will draw air into the chamber 11, and the air will be confined in said chamber, by reason of the small port 11', to such extent that the gravitative valve 14 will be effectively cushioned and held practically stationary while the engine is working, and said valve will be prevented from fluttering or vibrating to an extent which will vary the air-inlet and consequently change the consistency of the gas which is being mixed in the chamber 3.

The ports 13 in the cap 10 provide a constant supply of atmospheric pressure directly beneath the closed bottom of air-valve 14, which serves to assist in lifting said valve whenever the suction of the engine piston creates a vacuum in the chamber 3, for admitting air into the tube 17. The ports 13 also afford means for the escape of the air which might otherwise become entrapped in the casing 2 beneath the valve 14 and offer resistance to the said valve when the latter tends to close, either partially or wholly, by the slowing down or stopping of the engine.

Above the central air passage 17 is disposed a relatively small transverse tube or pipe 23, constituting a nozzle through which the gasolene or other oil is fed into the carbureting chamber 17. The inner end of the tube 23 preferably extends to the center of the tube 17, as shown in Figs. 1, 2 and 4. The tube 23 then passes through a suitable opening in the wall of the chamber 3, and its outer end pierces and communicates with a cylindrical liquid chamber 24, which projects upwardly from the casing 2, just above the inlet chamber 4. The casing of chamber 24 is preferably formed integrally with the casing 2, and has an open top, which is closed by a screw-cap 25. The lower end of the liquid chamber 24 is provided with an oil-port 26, which communicates with a horizontal passage or duct 27, through which the gasolene may be fed from any suitable storage tank or receptacle (not shown). The flow of the gasolene or other oil from the chamber 24 to the mixing chamber 3, is controlled by a cone-shaped valve 28, which is provided with a correspondingly shaped seat 29 formed in the cylinder 24. The body of valve 28 in its preferred form is provided with a number of circumferential grooves to produce a number of frustum-shaped rings in order to reduce its bearing surface and insure a more even wear on said surface, and at the same time provide scraping edges for cleaning the valve seat to prevent clogging. The valve 28 has a stem 30, which passes upwardly through the removable cap 25, and projects some distance above said cap, where it connects in a pivotal manner with a rocking lever 31, by a pin 32. The valve-stem 30, lever 31 and pin 32 are supported by guides 32' mounted on cap 25. The lever 31 is provided at its inner end with a declining forked arm 33, which is slotted at 34 to receive a pin 35, which operatively connects said arm to a vertically disposed rod 36, whose lower end passes through the wall of the casing 2, at a point above and concentric to the inlet chamber 4, where it connects with a yoke 37, preferably by means of threads (see Fig. 2). The free ends of the yoke 37 connect in a pivotal manner, by means of screws or pins 38 to the upper end of the tubular inlet valve 14. The upper end of the rod 36 extends some distance above the connection with the lever 31, passing through a guide lug 36' formed on the casing, and is arranged to contact with the short arm 39 of a bell-crank lever 40, which is employed for throttling the valve 14, for regulating the intake of the fresh air through the ports 9—15. The throttling lever 40 is mounted upon a rock-shaft 41, which is journaled in lugs or projections 42 formed integral with the jacket 6, and this shaft is held in place by means of a nut 43. Any of the well-known means may be employed for operating the throttle lever 40. The rocking valve operating lever 31 has a substantially square arm 44, which extends outwardly away from the casing and the valve stem 30, and this arm is fitted with a guide-block 45, having a longitudinal opening conforming to the shape of the arm 44, which is freely slidable on the said arm, and constitutes the pivot upon which the lever 31 tilts or rocks when operated by the valve 14. The guide-block 45 has a pair of like inwardly extending integral arms 46, forming a fork, both of said arms being perforated to receive pins 47 employed for pivoting similar arms 48 of a second guide-block 49 to the guide-block 45. The guide-block 49 is perforated longitudinally and is slidable upon a substantially square pin or stud 50, which is made rigid in the casing 2. The outer end of the guide-block 49 is perforated to facilitate connecting with any suitable operating rod or chain, as 50', by means of which the engineer may adjust the said guide-block, for controlling the flow of gasolene from the liquid chamber 24 to the carbureting chamber 3.

Any suitable means may be employed for screening the several air-inlets for preventing the entrance of dust or dirt into the interior of the device.

Having thus described the construction of my carbureter, I will now explain its operation.

Before starting the engine, the guide-block 49 is set at the desired point on the stud or pin 50, by the operation of the said lever or other part 50', which, owing to the connections 48, 47 and 46, will shift and set the guide-block 45 in the desired position on the arm 44 of the rocking lever 31. The guide-block 45 comprises the pivot upon which the valve lever 31 is rocked, for opening the valve 28 for feeding the gasolene through pipe 23 into the carbureting chamber 3. The valve operating and controlling parts having been adjusted and set to cause valve 28 to be opened the required degree by the air-valve 14, and the throttling lever 40 also having been set in the position to allow the rod 36 to travel the proper distance, the engine may be started. As soon as the engine is started, the suction of its piston creates a vacuum in the chambers 3 and 4 of casing 2, and lifts the tubular valve 14 for opening the ports 9 and 15. By the opening of said ports the air is drawn into the chamber 4 and thence into and through the central tube 17, owing to the auxiliary passage surrounding said tube being closed by the contact of the flaring mouth 16 with the air valve 14. The upward movement of the valve 14 forces the rod 36 upwardly, and owing to its connection through pin 35 with the slotted arm 34 of the rocking lever 31, lifts the inner end of said lever, and swings said lever on its pivot—the guide-block 45 (see Figs. 1, 2 and 8). The lever 31 being connected to the stem 30 of valve 28, will then lift the said valve free from its seat 29, and thus allow the gasolene to flow from the duct 27, through the port 26, the chamber 24 and the pipe 23, and discharge the liquid directly over the upper mouth of the central tube 17, where it is instantly vaporized by the strong upwardly flowing air pressure, and then drawn into the engine by the suction, for compression and explosion.

The position at which the pin or pivot center 47 of the guide-blocks 45—49 is set on the arm 44 of lever 31, determines the extent valve 28 may be opened and thus regulates the quantity of oil which may be drawn by the suction of the engine into the carbureting chamber 3.

If it is found that the proportion of the liquid should be increased or decreased in proportion to the volume of air admitted through the tube 17, to meet changes in weather conditions or for other reasons, the operator can readily adjust the guide-blocks 45 and 49 to a greater or less distance from the valve stem 30, which will correspondingly increase or decrease the leverage or movement of the rocking lever 31, and thus regulate the action of the liquid valve 28. When the guide-blocks 45 and 49 are once set in position to produce satisfactory results, they need not be disturbed, except it is desired to close the valve 28 completely for shutting-off the feed of liquid to the chamber 17, as explained.

Figs. 1, 2 and 8 all show the pivot center (47) of the rocking lever 31 positioned a considerable distance to the right of the point where said lever connects with the stem of the valve 28. Fig. 8 shows the manner and the distance the valve 28 may be lifted for measuring a certain quantity of gasolene to be fed into the carbureting chamber 3. If the parts are left in the position described, the proportion of gasolene to the volume of air entering the tube 17, will continue the same relatively, whether the engine is running at high or low speed, and whether the inlet valve 14 opens to a greater or less extent than shown in Fig. 3. By the adjustable arrangement of the guide-blocks 45 and 49, any desired proportion of the gasolene, within a considerable range, may be obtained, and the engineer may set the device for changing the mixture from one consistency to another, and he will know, by noting the position of the blocks 45 and 49 relatively to the valve stem pivot 32, the exact proportion of the gasolene and air which is being fed to the engine. By manipulating the throttle lever 40, as shown by the full and dotted lines in Fig. 2, the volume of air admitted through the ports 9 and 15 may be regulated—increased or decreased—for effecting strong or weak explosions in the engine cylinders.

At the first starting of the engine, the air inlet valve 14 is lifted but a slight distance, for instance, as shown in Fig. 3. As the speed of the engine increases and the suctions become more rapid and strong, the inlet valve will be lifted to a greater height, thus increasing the area of the inlet ports 9 and 15, for admitting a greater volume of air into the carbureting chamber 3 by way of the central passage 17, and also through the auxiliary chamber 4. As the upward movement of the valve 14 continues, through its connection with the liquid valve 28, the latter valve will be opened to a relatively greater degree, for permitting a greater quantity of gasolene to be drawn into the carbureting chamber to correspond to the increased volume of air drawn through the inlet ports. Under this arrangement, the proportion of gasolene to the volume of the air will be the same relatively, no matter what the position of the throttle lever 40 may be.

When the valve 14 is lifted to a greater distance than shown in Fig. 3, an increased quantity of air will enter the auxiliary chamber 4, by passing around and over the flaring mouth 16 of the tube 17. This increase of air will produce a greater engine speed, but, it is understood, however, that this extra supply of air is to be controlled by the throttling lever 40, so that the desired proportions of air and gasolene may be maintained in the mixture, for producing adequate power, regardless of the quantity of air drawn into the chamber 3. The manipulation of the throttle for decreasing the air inlet area, will cause the valve 14 to gravitate to and remain at a lower level in the casing, thereby restricting the area of the ports 9 and 15. The described connections between the valve 14 and the valve 28 will cause the latter valve to move simultaneously and correspondingly, to reduce the feed of the gasolene, but nevertheless maintaining the same relative proportion of the liquid to the decreased volume of air, as described.

To shut off the supply of gasolene or other oil entirely from the carbureting chamber 3, the engineer should shift the guide-blocks 45 and 49 from the running position shown in Figs. 1, 2 and 8 to the positions illustrated in Figs. 6 and 7 which will bring the pivot center or fulcrum 47 concentric to the pin 32, which pivotally connects the valve stem 30 to the rocking lever 31. When the parts are shifted and set in the latter position the lever 31 may be rocked vertically by the opening and closing of the inlet valve 14, through its connection by means of rod 36, but the fulcrum 47 having been shifted to the same center as the pin 32, the liquid valve 28 will remain seated while the lever 31 rocks idly on pins 32 and 47 as its fulcrum, thus holding valve 28 closed and preventing the passage of any gasolene from the duct 27 through the chamber 24 and pipe 23 into the carbureting chamber 3. The shutting off of the supply of gasolene to the carbureting chamber 3, may be accomplished with the same facility and readiness as the operations hereinbefore described for increasing or decreasing the quantity of oil to be fed to the engine for varying the consistency of the mixture of the combustible gas.

The complete cutting off of the liquid while the engine is running is desirable in instances where the engine is mounted on a vehicle. For example: When the vehicle is descending a grade or traveling under momentum following the cutting-out of the ignition means, by allowing the liquid-valve 28 to close as stated, the piston is caused to draw the air into the cylinders of the engine and thus effectually cool the engine. It will be understood that during the cooling interval, the throttling device may be fully opened to allow the cylinders to receive the air to its fullest capacity. As the engine slows down, the resultant decrease in suction will allow the gravitating air-valve 14 to move downwardly. This movement of the inlet valve will be very gradual owing to the slow escape of air from the chamber 11 of the dash-pot. The valve 14, however, will not completely close until the engine comes to rest.

The arrangement of the throttling lever 40 is such that, it acts directly upon the air-inlet valve 14, for restricting the inlet ports 9 and 15, thus decreasing the volume of fresh air to be drawn into the mixing chamber. Under this arrangement, the mixture passage between the carbureting chamber and the engine is left unrestricted, so that the full draft of the suction of the piston takes effect upon the chambers 3 and 4, thus creating a stronger vacuum, than if said ports were left open and the throttling was applied above the point where the gas is being mixed. By the partial closing of the ports, a decreased amount of air is drawn through the central air passage with greater force, thereby effecting a more perfect vaporization of the liquid drawn from the pipe 23 and producing a more highly combustible gas for effecting stronger explosions in the cylinders of the engine.

Having thus described my invention, what I claim as new and desire to secure by Letters Patent, is—

1. In a carbureter, the combination with a hollow body having a mixing chamber and air-inlet ports arranged below said chamber, of a tubular valve sliding telescopically within the hollow body opposite to the air-inlet ports therein, a central air-passage having a flaring mouth located within the sliding tubular valve and its upper open end positioned in the mixing chamber, a liquid inlet valve having a discharge orifice positioned over the upper open end of said central air-passage, and means connecting the liquid inlet valve and said tubular air-inlet valve for conjoint action of both of said valves.

2. A carbureter, comprising a hollow body having a mixing chamber and a tubular air inlet valve reciprocally fitting the body below the mixing chamber, adapted to be opened by suction and to be closed by gravity, a liquid-inlet valve mounted on the body adapted for supplying liquid to the mixing chamber to be mixed with the air, a rocking lever pivotally supported by the stem of the liquid valve and capable of being rocked by the reciprocal action of the tubular valve, a variable fulcrum for said lever, means for shifting said fulcrum for preventing the opening of said liquid valve, and means for adjusting said fulcrum for permitting the opening of the liquid valve.

3. A carbureter, comprising a hollow body having a mixing chamber and a tubular inlet valve telescopically fitting the body below the mixing chamber, adapted to be opened by suction and to be closed by gravity, means for limiting the opening movements of said valve, a liquid valve carried by said body adapted for supplying liquid to the mixing chamber for mixing with the air to form a combustible vapor, a rocking lever pivotally supported by the stem of the liquid valve adapted to be rocked by the reciprocal movements of the inlet valve, said lever adapted to be rocked on said pivot for preventing the opening of the liquid valve, and means for effecting the rocking of said lever on an independent pivot for opening said liquid valve.

4. A carbureter, comprising a hollow body having a mixing chamber, a tubular air inlet valve telescopically fitting the body below the mixing chamber, said valve adapted to be lifted by suction for admitting air into the mixing chamber, said valve adapted to descend by gravity for shutting-off the supply of air from said chamber, a liquid inlet valve mounted on the body adapted for supplying a combustible liquid to the mixing chamber to be mixed with the air, a rocking lever pivotally connected to the stem of the liquid valve capable of being rocked by the reciprocal action of said tubular valve, on said pivot as a fulcrum without opening the liquid valve, and an adjustable fulcrum carried by said lever adapted to be set for allowing said lever to be rocked on an independent center for delivering a measured quantity of liquid to the carbureting chamber.

5. In combination, a hollow body having a mixing chamber and a tubular air inlet-valve telescopically fitting the body below the mixing chamber, a liquid-valve carried by the body adapted to supply liquid to the mixing chamber when opened by the upward movement of the tubular valve, the said liquid valve having an upwardly projecting stem, a rocking lever pivoted to the free end of said stem, said lever having a pivot comprising a fulcrum upon which said lever may be rocked without opening the liquid-valve, and an adjustable fulcrum capable of being set in different positions for varying the extent to which said liquid-valve may be opened by the rocking of said lever, for permitting varying quantities of liquid to be drawn into the mixing chamber, and manually-operable means for shifting the centers of said rocking lever.

6. In combination, a hollow body having a mixing chamber and an air inlet chamber, a concentrically disposed tube, forming a direct air-passage from the inlet chamber to the mixing chamber, a liquid chamber disposed above the inlet chamber, a pipe for carrying the liquid from the liquid chamber to the mouth of the said tube, a valve in the liquid chamber, a rocking-lever operatively connecting with the stem of said valve, a slidable pivot-block mounted on said rocking-lever, said pivot-block capable of being shifted and set for preventing the opening of said valve, and means for shifting and holding said pivot-block, for permitting the opening of said valve by the rocking of said lever.

7. In combination, a hollow casing having a mixing-chamber and an air inlet chamber, a liquid-chamber carried by said casing and communicating with the mixing-chamber for the passage of liquid, a valve in the liquid-chamber, a rocking-lever operatively connected to the stem of said valve, a movable pivot carried by said rocking-lever, comprising a guide-block slidably mounted on said lever, means for adjusting said guide-block for shifting the pivot of said rocking-lever to a point directly over said valve for cutting off the supply of liquid to the mixing-chamber, and means for shifting said pivot for permitting said lever to open said valve for allowing the liquid to be drawn into the mixing-chamber.

8. A carbureter comprising a hollow body having an air inlet and a gas mixing chamber arranged eccentric to each other, a series of air ports formed in the inlet chamber, a central air passage in said body having a flaring mouth adjacent the said air ports, a tubular valve telescopically fitting said inlet chamber having ports corresponding to said first named ports, said valve adapted to be lifted by the suction of an engine for bringing the two series of ports into position for admitting air into said central air passage, a liquid supply valve to control the feed of liquid into said mixing chamber, a rocking lever for operating the liquid valve, a rod and a yoke for connecting said tubular valve with the rocking lever adapted for rocking said lever for opening the liquid valve, adjustable means carried by said rocking lever for permitting or preventing the opening of the liquid valve, and means for preventing the fluttering or vibration of the tubular valve.

9. A carbureter for explosive engine, having a hollow body provided with a mixing chamber and an air inlet chamber, a vertically reciprocating air valve for controlling the inlet of air to said chambers, a liquid valve mounted on said body, a rocking lever for operating said liquid valve, a rod and a yoke for connecting said inlet valve with said rocking lever, a guide-block slidably mounted on said rocking lever, adapted for pivotally supporting said lever, and means for shifting said guide-block in one direction for preventing the opening of said liquid valve, the said means adapted for shifting said guide-block in the opposite direction for varying the extent said liquid valve may be opened by the lifting of said air valve.

10. A carbureter, comprising a hollow casing having a mixing chamber in its upper portion and a series of air inlet ports in its lower portion, a tubular inlet valve telescopically fitting the lower portion of the casing adapted for opening said ports when lifted by the suction of an engine, said valve adapted to close said ports by gravity after the engine is stopped, a liquid supply valve having a stem, a rocking lever pivoted to said stem, a rod for connecting said lever to the tubular inlet valve, a guide-block carried by said lever, said guide-block forming the pivot upon which said lever is rocked, means for shifting and holding said guide-block in different positions on said lever for controlling the rocking movements of said lever, whereby said liquid valve may be opened to varying degrees, or may be held in closed position while the engine is working, and a throttling device for controlling the tubular valve.

11. A carbureter for explosive engine, comprising a hollow body provided with upper and lower eccentric chambers, a central air-passage connecting said chambers, the lower end of said passage formed with a flaring mouth, a tubular air inlet valve telescopically fitting the body and disposed between the body and the flaring mouth of said passage, air inlet ports formed in the lower portion of the body surrounding said flaring mouth, windows formed in the tubular valve corresponding in number and spacing to said air inlet ports, the said windows adapted to register or coincide with the air inlet ports of the body when the tubular valve is lifted by the suction of the engine for admitting air into said central passage, a liquid chamber communicating with the upper chamber of the body, a valve in said liquid chamber, said valve adapted to be opened and closed by the action of said tubular valve, manually operated adjusting means for permitting or preventing the opening of said liquid valve, the said means adapted for varying the extent said liquid valve may be opened, and a throttling device for controlling the upward movement of said tubular valve.

12. A carbureter, comprising a hollow body having a chamber for mixing air and liquid, and having a tubular air inlet valve adapted to be opened by suction for admitting air into said chamber, and to be closed by gravity for shutting-off the supply of air, a liquid inlet valve mounted on the exterior of the body adapted to supply liquid to the mixing chamber, a rocking lever operated by said tubular valve, said lever pivotally connected to the stem of the liquid valve and capable of being rocked on the said pivot as its fulcrum, for shutting off the supply of liquid to the mixing chamber, means for shifting the fulcrum of said lever, for effecting the opening of the liquid valve, for varying the quantity of liquid in proportion to the volume of the air.

13. A carbureter, comprising a hollow body having a mixing chamber and a tubular air inlet valve disposed below the said chamber, said valve adapted to be opened by suction and to be closed by gravity, a liquid inlet valve carried by the body adapted to supply liquid to said chamber for mixing with the air admitted through said tubular valve, a mechanism for operatively connecting the tubular valve with the stem of the liquid valve adapted to be actuated simultaneously and correspondingly with the reciprocal movements of said tubular valve, means for preventing said mechanism from opening said liquid valve, and means for permitting said mechanism to open said liquid valve to different degrees, for varying the quantities of liquid which may be drawn into the mixing chamber by the suction in proportion to the volumes of air.

14. In a carbureter, the combination with a mixing chamber, and a reciprocating tubular air inlet valve adapted to be opened by suction for supplying air to said chamber, of a liquid chamber communicating with the mixing chamber, a reciprocating valve in said liquid chamber, a series of operating parts connecting the tubular valve with the liquid valve, one of said parts capable of being operated on different centers, means for effecting the operation of said part on one center as a fulcrum for preventing the opening of the liquid valve, and means for operating said part on a number of other centers, for opening the liquid valve simultaneously and correspondingly with the opening of the tubular valve.

15. In a carbureter, the combination with a mixing chamber, and a reciprocating tubular valve adapted to be opened by suction for supplying air to said chamber, of a liquid chamber communicating with the mixing chamber, a valve in said liquid chamber, a rocking lever pivoted to the stem of the liquid valve adapted to be actuated by said tubular valve, said lever having an adjustable center, means for effecting the rocking of said lever on a center as a fulcrum for preventing the opening of the liquid valve, and on the adjustable center as a fulcrum for permitting the liquid valve to be opened simultaneously and correspondingly with the opening of the tubular valve for supplying a quantity of liquid relatively proportionate to the volume of air drawn into the mixing chamber.

16. In combination, a hollow body having a mixing chamber and an air inlet-valve disposed below the mixing chamber, said valve capable of being lifted by suction for admitting air into the mixing chamber, a liquid valve for supplying gasolene to the mixing chamber, said liquid valve adapted to be opened and closed by the reciprocal movements of said inlet-valve, a rocking lever pivoted to the stem of said liquid valve, said lever when rocked on the said pivot as a center incapable of opening said liquid valve, said lever when rocked on a center independent of said pivot, capable of opening said liquid valve, a guide-block slidably mounted on said lever, a second guide-block slidably mounted on a stud carried by the body, the said guide-blocks being pivotally connected, the said pivot when set eccentric to the first named pivot constituting the said independent center upon which said lever may be rocked for opening the liquid valve, means for manually shifting said guide-blocks for permitting or preventing the opening of the liquid valve, and manually-operated means for controlling the opening movement of said inlet-valve.

17. In combination, a hollow casing having a mixing-chamber and an air inlet-valve disposed below the mixing-chamber, said valve capable of being raised by suction for admitting air into the mixing-chamber, said valve adapted to gravitate to closed position for shutting-off the air when the suction is relieved, means for holding said valve from fluttering during the intervals of the suction, a liquid-valve for supplying liquid to the mixing-chamber, said valve adapted to be opened and closed simultaneously by the opening and closing of the inlet-valve, said liquid-valve having an upwardly projecting stem, a rocking-lever pivoted to the free end of said stem, means for rocking said lever on said valve-stem, without opening said liquid-valve, means comprising a part slidable on said lever capable of being shifted and set in different positions for varying the extent to which said liquid-valve may be opened, whereby the quantities of liquid may be increased or decreased in proportion to the volume of air admitted through the inlet-valve, and means for manually shifting said slidable part.

18. In combination, a hollow body having a mixing chamber and an air inlet chamber, an inlet-valve telescopically fitting the body adapted to control the admission of air to the mixing chamber and to be operated by the suction of an engine, a liquid chamber carried by the body and communicating with the mixing chamber, a valve in the liquid chamber, a rocking lever operatively connected to the stem of the latter valve adapted to be rocked by the operation of the inlet-valve, a movable pivot carried by the rocking lever, comprising a guide-block slidably mounted on said lever, means for shifting the pivot of the rocking lever to a center for preventing the liquid from entering the mixing chamber, and means for adjusting and setting said guide-block in different positions on the rocking lever, for varying the quantities of liquid to be drawn into the mixing chamber by the opening of the liquid valve.

19. In a carbureter, the combination with a hollow body containing a mixing chamber, and having a series of air inlet ports below said chamber, of a tubular valve telescopically fitting the body, adapted to be operated by suction for opening said air ports, and to be operated by gravity to close said air ports, a liquid valve adapted for supplying liquid to the mixing chamber to be mixed with the air, the said valve adapted to be opened and closed by the reciprocal movements of said tubular valve, means for shutting-off the supply of liquid while the tubular valve is open, means for limiting the opening movement of said liquid valve by the tubular valve for varying the consistency of the mixture of air and liquid, and means for holding said tubular valve stationary for rendering the mixture of air and liquid constant throughout the period of suction.

20. In a carbureter, the combination with a hollow body having a gas-mixing chamber, and an air-inlet valve reciprocated by suction and by gravity, of a liquid valve mounted on the body and communicating with the mixing chamber, a rocking lever pivoted between its ends to the stem of the liquid valve, one end of said lever operatively connected with the inlet valve, the other end being free, said lever capable of being rocked on the fulcrum fixed by its pivotal connection with the stem of the liquid valve without opening the liquid valve, an adjustable fulcrum carried by the free end of said lever upon which said lever may be rocked for opening the liquid valve, whereby a predetermined quantity of liquid may be drawn into the mixing chamber, the said adjustable fulcrum capable of being set in a number of positions for varying the quantities of liquid in proportion to the volume of air admitted to the mixing chamber by the inlet valve, and means for adjusting and setting the device repeatedly for producing a gas having the same relative proportions of air and liquid.

21. In a carbureter, the combination with a hollow body having a gas-mixing chamber and an air inlet valve reciprocated by suction and gravity, of a liquid inlet valve mounted on the body and communicating with the mixing chamber, a rocking lever pivoted between its ends to the stem of the liquid valve, one end of said lever operatively connected with said inlet valve, the other end being free, said lever capable of being rocked on the center or fulcrum fixed by its pivotal connection with the stem of the liquid valve without opening said valve, a forked guide-block slidably mounted on the free end of said lever, a forked guide-block slidably mounted on a stud carried by the body, the corresponding arms of said guide-blocks being pivotally connected, the pivots of said guide-blocks constituting an adjustable and movable fulcrum upon which said lever may be rocked for opening the liquid valve, whereby a predetermined quantity of liquid may be supplied to the mixing chamber, the said movable fulcrum capable of being set in a number of positions for varying the quantities of liquid in proportion to the volume of air admitted to the mixing chamber by said inlet valve, and means for adjusting the device for producing a gas having the same relative proportions of air and liquid for an indefinite period.

22. A carbureter, comprising a hollow body having a chamber for mixing air and liquid, and having a tubular air inlet valve adapted to be opened by suction for admitting air into said chamber, and to be closed by gravity for shutting-off the supply of air, a liquid inlet valve mounted on the exterior of the body adapted to supply liquid to the mixing chamber, a rocking lever operated by said tubular valve, said lever pivotally connected to the stem of the liquid valve and capable of being rocked on the said pivot as a center, for shutting off the supply of liquid to the mixing chamber, means for shifting the working fulcrum of said lever away from the said center, for effecting the opening of the liquid valve, for varying the quantity of liquid in proportion to the volume of the air, and means for effecting and maintaining the same relative proportions of the mixture of the air and liquid regardless of the quantities of said elements entering the mixing chamber.

In testimony whereof I affix my signature in presence of two witnesses.

WILLIAM A. CAHILL.

Witnesses:
 HARRY D. WALLACE,
 WM. C. ANDERSON.